(12) United States Patent
Wang et al.

(10) Patent No.: US 7,643,615 B2
(45) Date of Patent: Jan. 5, 2010

(54) RADIOGRAPHIC MARKER FOR INCLINATION ANGLE OF IMAGING RECEIVER

(75) Inventors: Xiaohui Wang, Pittsford, NY (US); David H. Foos, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 106 days.

(21) Appl. No.: 11/862,596

(22) Filed: Sep. 27, 2007

(65) Prior Publication Data

US 2009/0086924 A1    Apr. 2, 2009

(51) Int. Cl.
*H05G 1/26* (2006.01)
*G01D 18/00* (2006.01)

(52) U.S. Cl. .................... 378/165; 378/162; 378/207

(58) Field of Classification Search ........... 378/162, 378/163, 165, 204, 205, 206, 207
See application file for complete search history.

(56) References Cited

U.S. PATENT DOCUMENTS

| | | | |
|---|---|---|---|
| 2,118,773 A * | 5/1938 | Ball ............................ 235/83 |
| 2,649,548 A | 8/1953 | Greenberg |
| 2,796,525 A * | 6/1957 | Nordstrom .................. 378/165 |
| 3,263,647 A * | 8/1966 | Murphy et al. ............... 116/309 |
| 4,127,774 A * | 11/1978 | Gillen ......................... 378/165 |
| 4,267,641 A | 5/1981 | Shinozaki et al. |
| 4,429,412 A | 1/1984 | Pierce et al. |
| 5,224,147 A | 6/1993 | Collin et al. |
| 5,640,438 A | 6/1997 | Talluto et al. |
| 6,097,978 A * | 8/2000 | Demarais et al. ............. 600/429 |
| 6,221,082 B1 * | 4/2001 | Marino et al. ................ 606/130 |
| 6,626,569 B2 * | 9/2003 | Reinstein et al. ............. 378/206 |
| 6,890,099 B2 * | 5/2005 | Tanaka et al. ................ 378/205 |
| 7,092,492 B2 | 8/2006 | Marn |
| 7,123,690 B1 * | 10/2006 | Brown et al. ................. 378/165 |
| 2008/0175353 A1 * | 7/2008 | Durack ........................ 378/162 |

* cited by examiner

*Primary Examiner*—Allen C. Ho

(57) ABSTRACT

A radiography marker for indicating the inclination angle of a radiography imaging receiver has a portion defining at least one area transparent to x-radiation and an angle indicator element attached to the portion defining at least one area at a pivot point and manually adjustable along the portion defining at least one area to set any of a plurality of angular positions over at least a portion of the at least one area transparent to x-radiation. At least a portion of the indicator element is opaque to x-radiation.

11 Claims, 6 Drawing Sheets

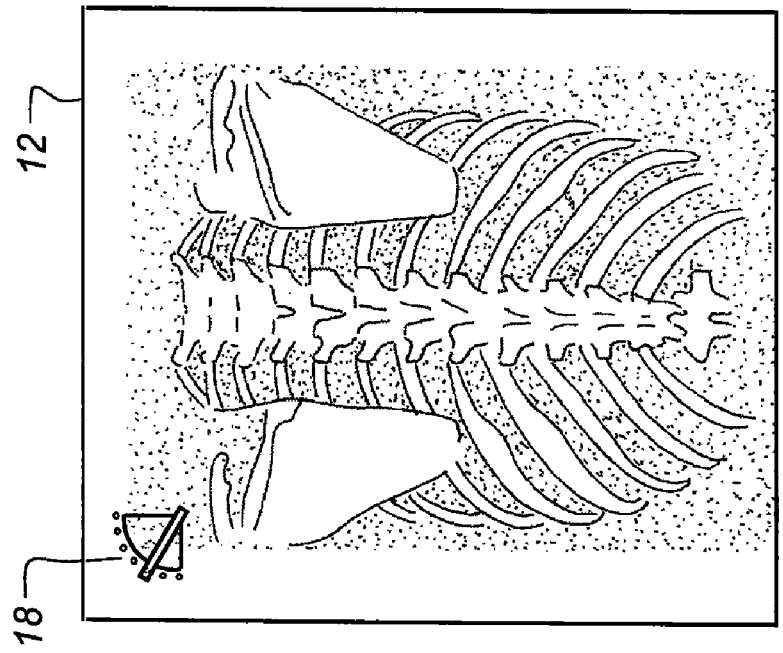
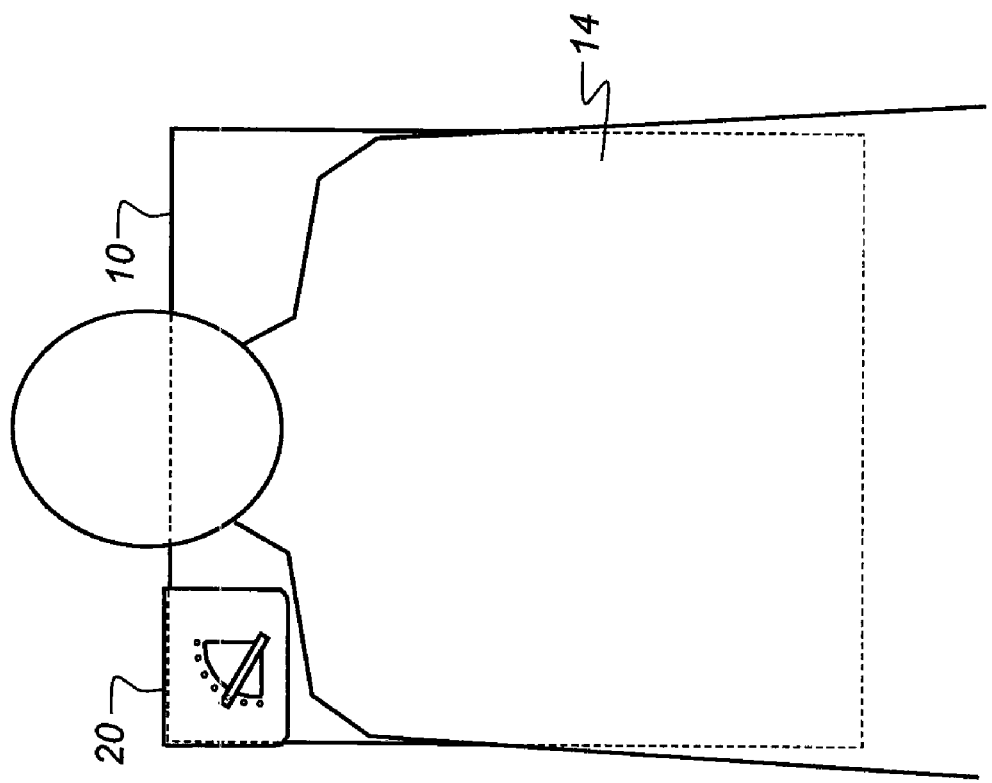
FIG. 1B
FIG. 1A

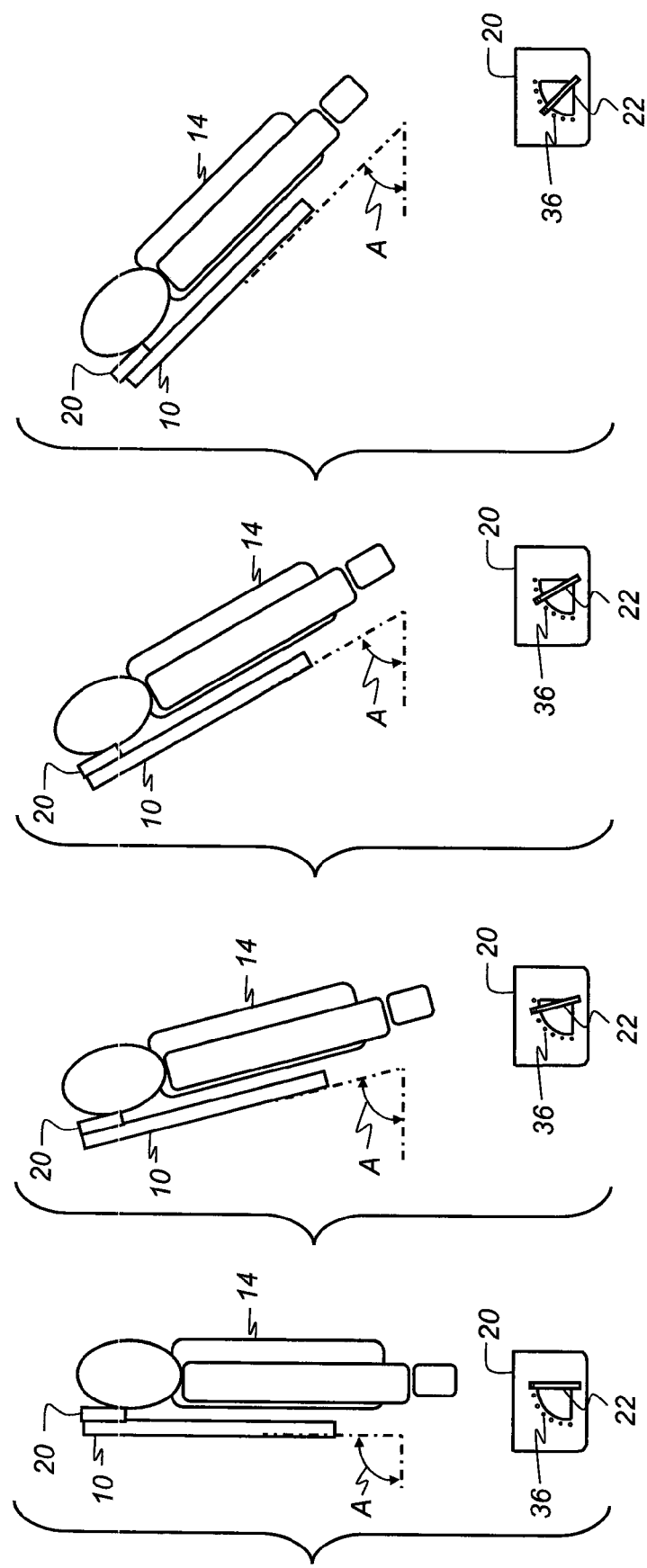

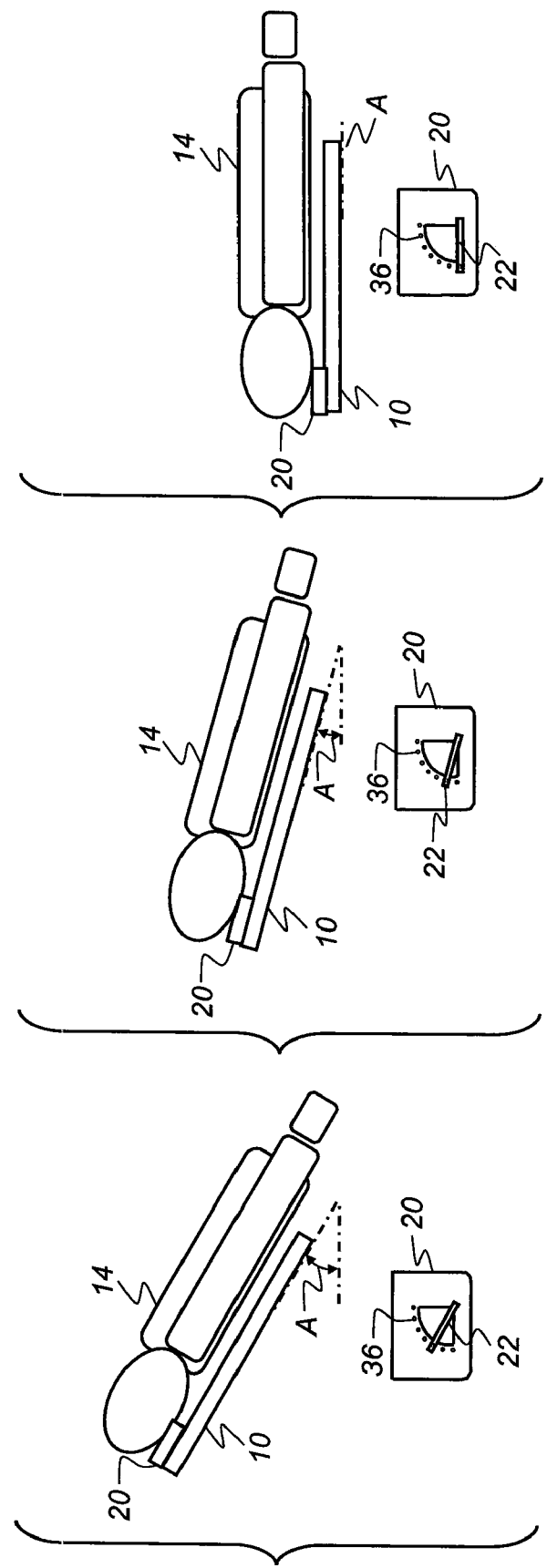

RADIOGRAPHIC MARKER FOR INCLINATION ANGLE OF IMAGING RECEIVER

FIELD OF THE INVENTION

This invention generally relates to radiographic imaging and more particularly relates to a marker for indicating inclination angle of a radiographic imaging receiver.

BACKGROUND OF THE INVENTION

A number of different types of radiographic markers have been developed and used to support the radiographic imaging process. For example, markers indicating "L" or "R" may be used to identify left or right areas or sections of the body that appear on the image. Other markers can identify the patient, doctor, or radiologic technician, date, imaging facility, and other information. Markers can also be used to show the orientation of the exposed area. To use a marker, the technician sets up the patient for imaging and places one or more markers in an area of the film or other type of receiver that will receive exposure energy but where the marker does not interfere with the diagnostic image content. Just a few illustrative examples of some types of Left/Right markers are described in U.S. Pat. No. 5,640,438 entitled "Radiographic Film Marker Assembly" to Talluto et al. which shows a clip-on marker device; and in U.S. Pat. No. 4,429,412 entitled "X-ray Film Marker" to Pierce et al. which shows a rotatable wheel for L/R marking.

For many types of X-rays, however, more information than mere Left/Right orientation is needed. In mammography, for example, it may be necessary for the technician to record the angle of exposure used for a particular patient. For chest x-rays, recording the angle of inclination of the patient during exposure can be important for proper imaging and diagnosis. Correspondingly, a number of marker solutions for providing information on patient angle have been proposed. For example, U.S. Pat. No. 2,649,548 entitled "Radiographic Clinometer" to Greenberg shows a device used to cast a shadow onto a radiographic plate for showing an inclination angle. U.S. Pat. No. 5,224,147 entitled "Angle Indicator for X-ray Machine" to Collin et al. shows a device with two beveled "gears" at right angles to each other that cooperate to show an inclination angle setting for use in mammography. U.S. Pat. No. 4,267,641 entitled "Radiographic Film Inclinometer" to Shinozaki et al. describes a device for approximating the inclination angle of the radiographic plate using a number of spheres contained within columns that extend orthogonally with respect to the rotation axis. U.S. Pat. No. 7,092,492 entitled "Universal Radiologic Patient Positioning Marker" to Marn describes a device in the form of a block fabricated with radio-opaque letters and fluid for showing overall image receiver orientation.

While there have been a number of different devices and methods proposed for showing the inclination angle of the patient during exposure, however, these have not been widely adopted for a number of reasons. Some of these devices and methods are relatively complex, such as the device described in the Collin et al. '147 patent, and some may require additional calculation, technician setup, or reading skill in order to obtain the inclination angle information from the film. Others, such as the Greenberg '548 device, can be bulky and cumbersome to use.

Thus, there is a need for a radiographic marker for inclination angle that is relatively easy for the operator or technician to use, can be read from film without requiring additional calculation, and can be readily transported from one imaging receiver or plate to the next.

SUMMARY OF THE INVENTION

An object of the present invention is to provide an improved radiographic marker for inclination angle of the radiographic receiver. Accordingly, the present application discloses a radiography marker useful for indicating the inclination angle of a radiography receiver, the marker including a portion defining at least one area transparent to x-radiation (radio-transparent); and an angle indicator element attached to the portion defining at least one area at a pivot point and manually adjustable to a setting (that is, settable) along the plate portion to any of a plurality of angular positions over at least a portion of the at least one area transparent to x-radiation, wherein at least a portion of the indicator element is opaque to x-radiation (radio-opaque).

An advantage of the disclosed radiographic marker is that it provides an intuitive device for indicating inclination angle of a radiographic receiver. The marker can be positioned along an edge of the receiver and manually set to a suitable position or setting by the operator.

An advantage of the disclosed radiographic marker is that it provides an intuitive device for indicating inclination angle of a radiographic receiver. The marker can be positioned along an edge of the receiver and manually set to a suitable position by the operator.

These and other aspects, objects, features and advantages of the marker will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 1A is a plan view showing how the marker of the present invention can be used in a typical application;

FIG. 1B is a plan view showing a radiographic image obtained using the marker of the present invention;

FIGS. 2A through 2G show a range of receiver inclination angles and corresponding settings of the marker of the present invention;

DETAILED DESCRIPTION OF THE INVENTION

Figure 3:
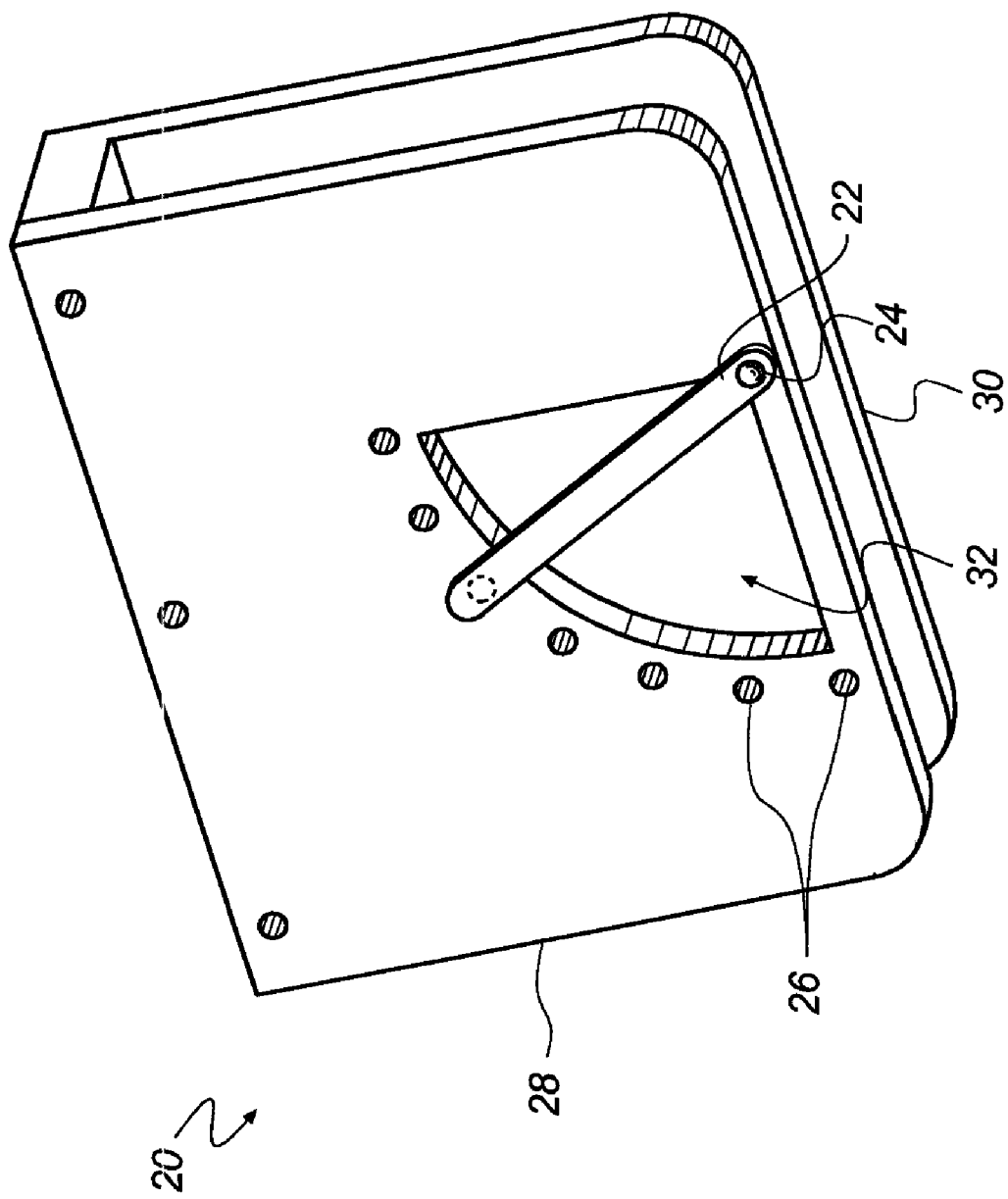
FIG. 3 is a perspective view showing the radiographic marker of the present invention in one embodiment.

The present description is directed in particular to elements forming part of, or cooperating more directly with, a radiographic marker. It is to be understood that elements not specifically shown or described may take various forms well known to those skilled in the art.

The disclosed radiographic marker can be used with any of the available types of radiographic imaging receivers. Compatible receiver types include, but would not be limited to, sensitized film or other photostimulable medium, a computed radiography (CR) plate, or a direct radiography (DR) detector. The marker is intended to be used where ionizing radiation, such as x-ray radiation, is used to produce a diagnostic image. The Figures are provided to show overall composition, function, and use of the marker and are not drawn with attention to scale. It is to be understood that any number of additional embodiments are possible, as defined by the claims.

FIG. 1A shows one embodiment of radiographic marker 20 of the present invention. Marker 20 is fitted onto a receiver 10, such as a film cassette, CR cassette, or DR receiver. FIG. 1B shows an image 12, such as a chest x-ray of a patient 14, obtained from receiver 10 and including a marker image 18 that results from use of marker 20. That is, marker 20 includes portions that are opaque to x-radiation (radio-opaque) and are placed in the path of the ionizing radiation during exposure, so that marker image 18 is formed along an edge of diagnostic image 12, outside of the diagnostically relevant image area.

Schematic FIGS. 2A through 2G show how marker 20 is used by the operator of the radiography system. Here, marker 20 can be used to indicate the inclination angle A of receiver 10 and, consequently, of patient 14, relative to hill horizontal or vertical position. In FIG. 2A, for example, receiver 10 is fully vertical or at angle A=90 degree position, as indicated by marker 20 in FIG. 2A. FIG. 2B shows an inclination of angle A at about 75 degrees from horizontal. FIGS. 2C and 2D show inclinations of about 60 degrees and 45 degrees, respectively. FIG. 2E shows an approximate 30 degree angle of inclination A. FIG. 2G shows an approximate 15 degree angle. Lastly, FIG. 2G shows a substantially horizontal angular inclination, where angle A=0, for receiver 10 and patient 14. As FIGS. 2A through 2G show, marker 20 has a manually adjustable or movable, pivotably mounted member, such as an indicator arm 22 that is at least partly radio-opaque. Arm 22 can be pivoted manually by the operator to any of a number of angular settings or positions 36 that may be defined by means for defining such as stops, detents, holes or labels. In order to appear on the radiographic image, as was described with reference to FIG. 1B, marker 20 has some combination of radio-opaque components and defines at least one area that is transparent to x-radiation (radio-transparent).

In order to use marker 20, the operator mounts marker 20 to the side of receiver 10 so that it does not obstruct the diagnostically relevant image area. The operator then manually sets the position of indicator arm 22 to correspond to the angular inclination of receiver 10. It has been found that precision angular measurement is, in most cases, not necessary; instead, only a reasonably close approximation is needed. Thus, for example, an error of less than 8 or 9 degrees in either direction would be acceptable in many cases. With reference to FIGS. 2B and 2C, for example, an operator setting of indicator arm 22 at the 60 degree position (FIG. 2C) would be acceptable where the actual inclination angle A is 68 degrees. A setting of indicator arm 22 at the 75 degree position (FIG. 2B) would also be acceptable for this same actual 68 degree inclination angle A.

FIG. 3 shows a perspective view of marker 20 in one embodiment. Marker 20 has a substantially flat portion, shown as a radio-opaque plate 28, and an offset rear plate 30. As shown, plates 28, 30 are joined to form a coupling for detachably mounting plate 28 to hold it against the surface of the receiver cassette (film or CR receiver) or the receiver body (DR receiver). Indicator arm 22, or other type of movable indicator, fastens to plate 28 at a pivot 24. Some type of marking is provided to indicate relative inclination angle, such as that provided by holes 26 through plate 28 at position 36 in this embodiment. Here, the end of indicator arm 22 is contoured to fit into any of holes 26, provided as detents so that indicator arm 22 easily can be positioned at one of the seven discrete positions of holes 26. Alternately, indicator arm 22 can be adjusted in a more continuous arrangement, without mechanical detents or other features for defining specific, discrete positions.

In order to form marker image 18, as shown in FIG. 1B, at least a portion of indicator arm 22 or other movable indicator is radio-opaque. In the embodiment of FIG. 3, both plate 28 and indicator arm 22 are radio-opaque. Holes 26 are formed though plate 28, permitting exposure energy to form an image pattern of the holes as was shown in FIG. 1B. An opening 32, a quarter-circular sector in the embodiment of FIG. 3, is also provided through plate 28 to improve visibility of indicator arm 22 in the final image.

It can be appreciated that a number of alternative embodiments are possible using the overall arrangement of plate 28 shown in FIG. 3. For example, indicator arm 22 could be radio-opaque only near its tip portion, obscuring the appropriate hole 26. Alternately, labels could be provided rather than holes, using radio-opaque numbers or other symbols, with the main body of plate 28 being radio-transparent. Other patterns of radio-opaque markings could be provided so that movable arm 22 position can be readily discerned from the radiographic image.

Indicator arm 22 as shown in the Figures is one type of movable indicator element that could be provided for rotation on pivot 24. A rotatable circular disc or portion of a circular disc could alternately be used, with some portion of the movable indicator element being radio-opaque.

Detachable coupling to receiver 10 is provided using an offset rear plate 30 in the embodiment of FIG. 3. With this arrangement, marker 20 clips onto receiver 10 so that it is securely positioned, but is also removable when imaging is completed. It can be appreciated that other arrangements are possible, including mounting to receiver 20 using magnets, screw or thumbscrew fasteners, clips, or other types of devices. Flexible hook-and-loop or hook-and-pile connectors, such as VELCRO fasteners from Velcro Industries B.V., Amsterdam, NL, are another familiar type of separable flexible fastening device that could be used for detachably mounting plate 28 against the surface of receiver 10. In practice, marker 20 can be detachably mounted, designed for re-use with each receiver 10 that is used, so that it remains at the operator station. Alternately, of course, marker 20 could be designed as a permanent fixture on the covering of a cassette or other receiver body.

Figure 4B:
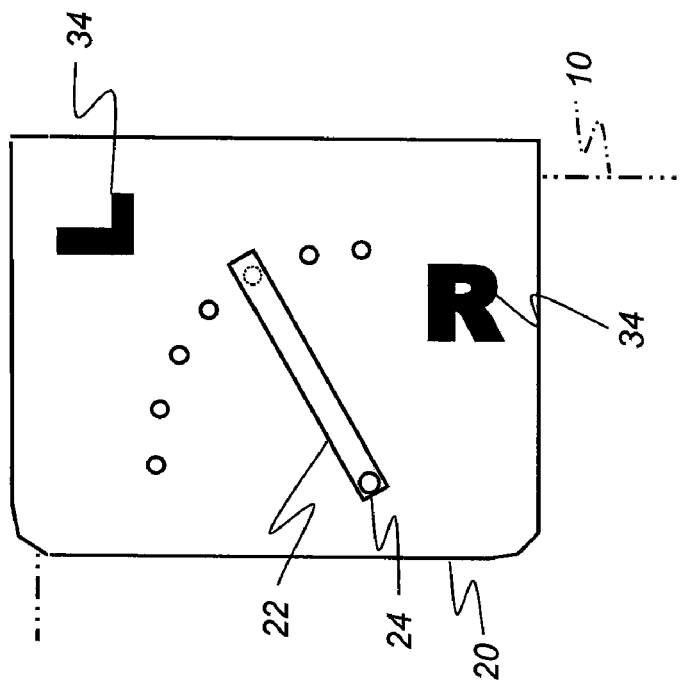
FIGS. 4A and 4B show the radiographic marker in an embodiment that includes radio-opaque labeling for different positioning of the marker.
Figure 4A:
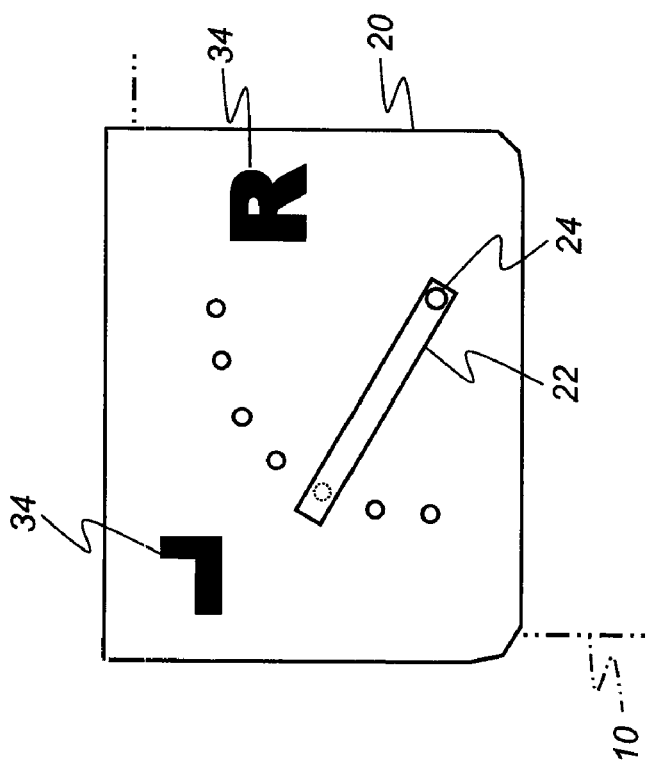

Marker 20 is intended to be mounted to receiver 10 over a portion of the imagable area that is not diagnostically relevant. It may be advantageous to be able to position marker 20 to either the right or left of patient 14 (FIG. 1A) depending on patient position, anatomy, and region of interest. Referring to FIGS. 4A and 4B, there are shown alternate positioning arrangements for marker 20 with corresponding left/right (L/R) markers 34 in the form of radio-opaque lettering. The edges of receiver 10 are indicated in phantom lines for reference. When marker 20 is mounted to the left when facing the patient, the orientation of FIG. 4A could be used, indicating the right side of the patient. When marker 20 is mounted to the right when facing the patient, the orientation of FIG. 4B could be used, indicating the left side of the patient. Here, the right-reading L/R marker 34 helps to orient the image that is obtained. The R/L lettering could be reversed from that shown in FIGS. 4A and 4B.

It can be useful to store information about the inclination angle as metadata for the obtained image. This metadata could be used in conjunction with the image storage in a Picture Archiving and Communications System or other appropriate medical image storage database. Using the apparatus and method of the present invention, it now becomes a straightforward task for image analysis software to determine the inclination angle from the image itself.

Figure 5:
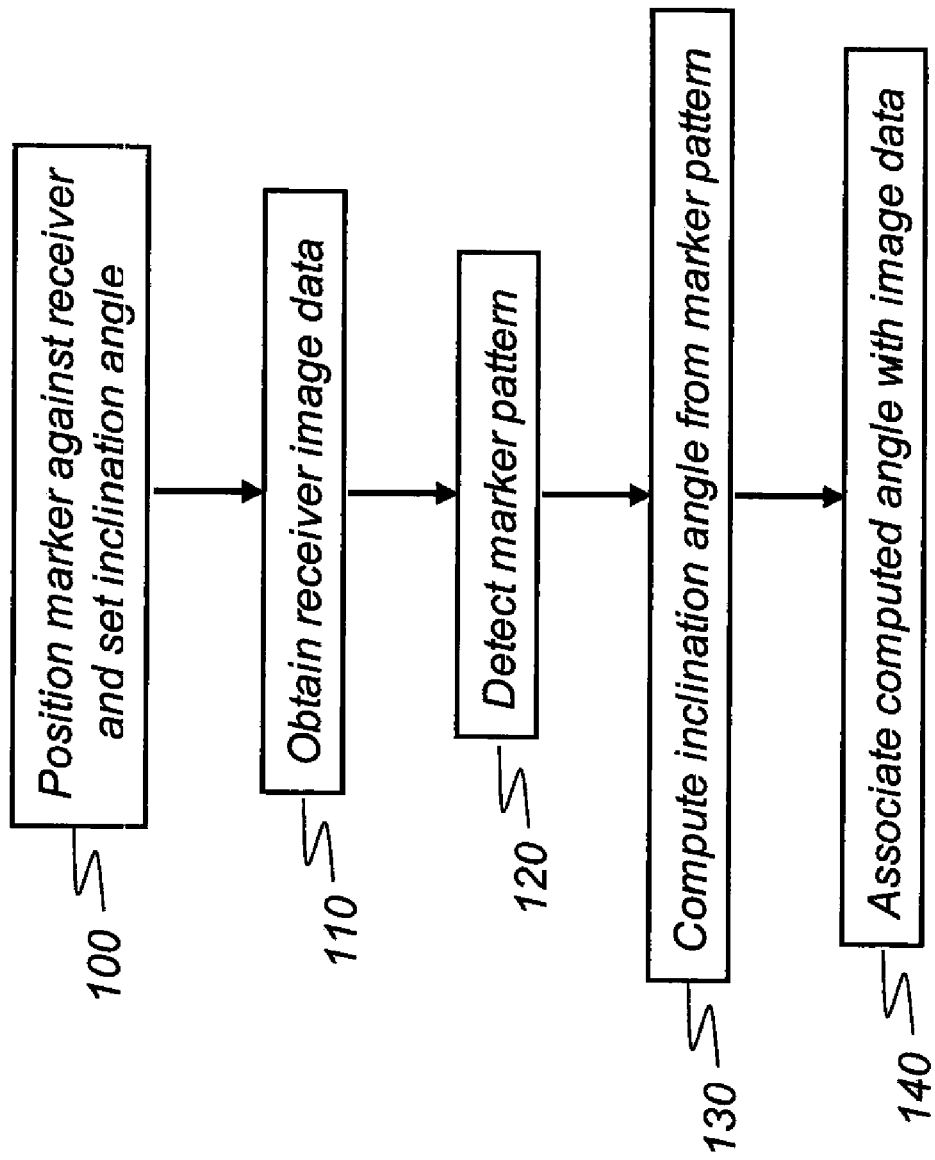
FIG. 5 is a logic flow diagram showing steps for interpreting the marker of the present invention in imaging control software.

Referring to FIG. 5, there is shown a logic flow diagram that gives a sequence of steps for obtaining and storing inclination angle metadata when using marker 20. In a preparatory step 100, the radiography technician, after placing the patient suitably against the receiver 10 and setting inclination angle A, places marker 20 against receiver 10 and manually sets the inclination angle appropriately. An imaging step 110 is then executed, providing a digital image of the area of interest.

Once the digital image has been obtained, the angle of inclination can be detected automatically from marker image 18 (FIG. 1B). In a marker detection step 120, pattern detection algorithms, familiar to those skilled in the imaging analysis arts, can be used to detect the relative position of indicator arm 22 or other movable indicator element used in marker 20. An angle computation step 130 is then carried out based on the detected marker position. In one straightforward embodiment, angle computation step 130 can be carried out by image analysis routines that identify the position of indicator arm 22 at one of one or more positions 36, such as those described earlier with reference to FIG. 3. Finally, a storage step 140 is executed, allowing storage of the angle information as metadata, associated with the image data for the radiographic image. Once this angle information is obtained, it can be made available to the radiography technician for subsequent imaging sessions if needed. This allows a series of images to be available for the diagnostician wherein all of the images are obtained at substantially the same angle of inclination.

The apparatus and method of the present invention provide improvements over conventional methods for indicating inclination angle of a radiographic receiver. Because marker 20 can be detachably mounted on the receiver in some embodiments, the operator can set the angle by measurement or observation once the patient is suitably positioned, then clip or otherwise fasten the marker to the receiver before obtaining the radiographic image. Marker 20 is intuitive and can be set visually, since exacting precision for angle measurement is not normally required. A simple pivot construction allows marker 20 to be simple in design, inexpensively constructed from low-cost materials, and durable.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, any of a number of materials could be used for fabrication of marker 20. Angles can be indicated at any number of discrete positions or over a continuous range, where the operator/technician visually approximates the inclination angle.

Thus, what is provided is an apparatus and method for indicating inclination angle of a radiographic imaging receiver.

| PARTS LIST | |
|---|---|
| 10. | Receiver |
| 12. | Image |
| 14. | Patient |

-continued

| PARTS LIST | |
|---|---|
| 18. | Marker image |
| 20. | Radiographic marker |
| 22. | Indicator arm |
| 24. | Pivot |
| 26. | Hole |
| 28. | Plate |
| 30. | Rear plate |
| 32. | Opening |
| 34. | L/R markers |
| 36. | Angular position |
| 100. | Preparatory step |
| 110. | Imaging step |
| 120. | Marker detection step |
| 130. | Angle computation step |
| 140. | Storage step |
| A. | Inclination angle |

The invention claimed is:

1. A radiography marker for indicating an inclination angle of a radiography receiver, the marker comprising:
a portion defining at least one area transparent to x-radiation, wherein the at least one area is substantially a sector of a circle; and
an angle indicator element attached to the portion defining at least one area at a pivot point, the angle indicator element being manually settable to a plurality of angular positions over at least a portion of the at least one area, wherein at least a portion of the indicator element is opaque to x-radiation.

2. A radiography marker for indicating an inclination angle of a radiography receiver, the marker comprising:
a portion defining at least one area transparent to x-radiation;
an angle indicator element attached to the portion defining at least one area at a pivot point, the angle indicator element being manually settable to a plurality of angular positions over at least a portion of the at least one area, wherein at least a portion of the indicator element is opaque to x-radiation; and
a coupling for detachably mounting the portion defining at least one area against a surface of a radiography receiver;
wherein the portion defining at least one area is a plate and the coupling comprises an offset plate.

3. A radiography marker for indicating an inclination angle of a radiography receiver, the marker comprising:
a portion defining at least one area transparent to x-radiation; and
an angle indicator element attached to the portion defining at least one area at a pivot point, the angle indicator element being manually settable to a plurality of angular positions over at least a portion of the at least one area, wherein at least a portion of the indicator element is opaque to x-radiation;
wherein the portion defining at least one area further comprises at least one detent at an angular position.

4. A radiography marker for indicating an inclination angle of a radiography receiver, the marker comprising:
a portion defining at least one area transparent to x-radiation; and
an angle indicator element attached to the portion defining at least one area at a pivot point, the angle indicator element being manually settable to a plurality of angular positions over at least a portion of the at least one area, wherein at least a portion of the indicator element is opaque to x-radiation;

wherein the portion defining at least one area further comprises left and right position markers.

5. A radiography marker for indicating an inclination angle of a radiography receiver comprising:
- a portion defining at least one area transparent to x-radiation;
- an angle indicator element attached to the portion defining at least one area at a pivot point, the angle indicator element being manually settable to a plurality of angular positions over at least a portion of the at least one area, wherein at least a portion of the indicator element is opaque to x-radiation; and
- a coupling for detachably mounting the portion defining at least one area against a surface of a radiography receiver outside a diagnostically relevant imaging area of the receiver.

6. The radiography marker of claim 5 wherein the portion defining at least one area further comprises means for defining an angular position.

7. The radiography marker of claim 5 wherein the angular positions are discrete positions.

8. The radiography marker of claim 5 wherein the angular positions are continuous.

9. The radiography marker of claim 5 wherein the angle indicator element comprises a movable arm.

10. The radiography marker of claim 5 wherein the portion defining at least one area is a plate and the coupling comprises an attached offset plate.

11. A method for storing image metadata for a radiography image comprising:
- providing a radiography marker having a pivotable member, at least a portion of the pivotable member being opaque to x-radiation;
- attaching the marker along an edge portion of a radiography receiver;
- manually setting the pivotable member of the marker to a position to indicate an inclination angle of the receiver;
- obtaining x-ray image data from the receiver while the marker is attached;
- detecting the position of the pivotable member of the marker in the image data;
- computing the inclination angle from the position of the pivotable member; and
- storing the inclination angle with the image data from the receiver.

* * * * *